United States Patent [19]  [11] 3,884,754
Kimura et al. [45] May 20, 1975

[54] HOLLOW FILAMENTS AND PROCESS FOR PRODUCING SAME

[75] Inventors: Isao Kimura; Hiroaki Koyama, both of Osaka, Japan

[73] Assignees: Kaneon, Ltd., Tokyo; Nippon Kynol Inc., Osaka, both of Japan

[22] Filed: Feb. 21, 1973

[21] Appl. No.: 334,200

[30] Foreign Application Priority Data
Feb. 22, 1972   Japan................................ 47-18750

[52] U.S. Cl....428/398; 264/29; 264/176; 264/344; 264/DIG. 19
[51] Int. Cl. .......................... B28b 3/20; D02g 3/00
[58] Field of Search ............. 161/172, 178; 260/2.1, 260/2.2, 2.5 M; 264/41, 45, 47, 317, 340, 344, 176, 347, 236

[56] References Cited
UNITED STATES PATENTS
3,650,102   3/1972   Economy et al................ 161/172 X
3,716,521   2/1973   Economy et al.................. 260/51 R

*Primary Examiner*—George F. Lesmes
*Assistant Examiner*—Lorraine T. Kendell
*Attorney, Agent, or Firm*—Sherman & Shalloway

[57]          ABSTRACT

A hollow filament comprising a filamentary polymer composed predominantly of a flame-resistant and anti-fusing cured novolak resin, characterized in that the hollow structure continuously extends in the axial direction of the filament, the degree of hollowness thereof being in the range of 10 – 80%, and a process for producing the same which comprises treating a filament consisting of a fiber-forming polymer of predominantly an uncured novolak resin composition, with a curing reagent in the presence of a curing catalyst to effect the cure of said filament extending from the peripheral portion to the axial portion thereof to a depth of 20–90% of the cross-sectional area of the filament, and thereafter removing the uncured core portion of said filament by extraction with a solvent.

13 Claims, No Drawings

HOLLOW FILAMENTS AND PROCESS FOR PRODUCING SAME

This invention relates to a cured novolak resin-based flame-resistant and anti-fusing hollow filament, which filament excels in such physical and chemical properties as flexural strength and resistance to attack by chemicals. The invention also relates to a process for producing these filaments.

There has been recently developed as a flame-resistant and anti-fusing synthetic filament a novolak resin-based non-hollow filament cured with aldehyde. However, this non-hollow filament, though acceptable in its flame-resistant and anti-fusing properties, is not fully satisfactory as yet, since it lacks flexural strength for use as a filament, is low in its warmth retention (i.e. insulating) property, and is lacking in its feel and handle.

It is known heretofore in the case of such semi-synthetic filaments as viscose rayon, cuproammonium rayon and acetate and such synthetic filaments as the acrylic and polyvinyl acetal type filaments that by making these filaments with a hollow structure they are imparted a pliant handle and a silky luster, their apparent bulk density is reduced and an improvement in their warmth retention porperty is achieved. However, those of hollow structure are not known yet in the case of the novolak resin-based flame-resistant and anti-fusing filament and the carbon filament. Further, the conventional method of making hollow filaments either consisted of spinning a blowing agent-admixed fiber-forming material and effecting the foaming and formation of the hollow during the formation of the filaments or subsequent thereto or of causing the copresence of a gas (such as air or nitrogen) in the spinning solution and thereafter spinning such a solution to form the hollow filaments.

However, the conventional methods of forming the hollow filaments such as described are operationally unsatisfactory and require a complicated apparatus. In addition, the quality of the products obtained is unsatisfactory.

It has now been found that a novel hollow novolak resin filament can be produced by treating a filament consisting of a fiber-forming polymer of predominantly an uncured novolak resin composition, with a solution containing a curing reagent and a curing catalyst to cure the surface layer portion (skin) of the filament while leaving the axial portion (core) thereof uncured followed by solvent extraction and removal of the uncured polymer of the core portion.

A primary object of the present invention is to provide a flame-resistant and anti-fusing, hollow novolak resin filament which not only excels in such physical and chemical properties as flexural strength, resistance to attack by chemicals and insulation property but also is light and has a pliant handle.

Another object of the invention is to provide a novel process for the production of a flame-resistant and anti-fusing, hollow novolak resin filament.

Other objects and advantages of the present invention will become apparent from the following description.

According to the present invention, there is provided a novel hollow filament, which consists of a filamentary polymer or a carbonized product thereof that is composed predominantly of a flame-resistant and anti-fusing cured novolak resin and is characterized in that it is of a continuous hollow structure extending along the axial direction of the filament, the degree of hollowness of which is 10 – 80 %.

In this specification the foregoing hollow filament which consists of a filamentary polymer that is predominantly of a flame-resistant and anti-fusing cured novolak resin will be referred to as a "hollow novolak resin filament".

Further, the "degree of hollowness", as used herein and the appended claims, is defined as the area of the hollow portion of a filament relative to the cross-sectional area thereof as calculated from the outside circumference of the filament.

The foregoing novolak resin filament of the invention can be produced in accordance with the present invention by treating a filament consisting of a fiber-forming polymer composed predominantly of an uncured novolak resin with a curing reagent in the presence of a curing catalyst to cure said filament from its peripheral portion towards the axial portion thereof to a depth of 20 – 90 % of its cross-sectional area and thereafter removing the uncured portion of the central part of the filament by extraction with a solvent.

The hollow novolak resin filament of the present invention is a filament consisting predominantly of an intermolecularly cross-linked, flame-resistant and anti-fusing novolak resin in which the sectional area of the filament is hollow (i.e., the central part of the filamentary section is a cavity), the degree of hollowness of which filament is 10 – 80 %, preferably 30 – 60 %, and most preferably 40 – 55 %. The present hollow novolak resin filament not only excels in such physical and chemical properties as flexural strength, resistance to attack by chemicals and insulation property but also is light and has a pliant handle.

The filamentary polymer compound predominantly of a novolak resin, which makes up the hollow novolak resin filament of the invention, may be constituted solely of the novolak resin, or it may be a blend of a novolak resin and up to 50 % by weight of the polymer of a thermoplastic synthetic resin. When the latter is present, it is contained in an amount of at least 0.1 % by weight, and preferably 1 – 40 % by weight, especially 5 – 30 % by weight, and most preferably 10 – 25 % by weight.

The novolak resin is a resin which is uncured and fusible in the starting molten mixture and can be cured with a curing reagent after melt-spinning. The method of preparing the novolak resin is well known per se. It can be produced by heat-reacting a phenol with an aldehyde in the presence of an acidic catalyst or an alkali catalyst. Usually, the novolak resins have an average molecular weight of about 300 to about 2000. If desired, those having a larger molecular weight (for example, up to about 5000) can be prepared. Therefore, as is well known, the predominantly novolak-type modified novolak resins obtained by any desired combination of the novolak-type reaction and the resol-type reaction can also be used. Furthermore, any desired combinations of phenols and aldehydes can be used, and different novolak resins each derived from a different combination of phenol and aldehyde can be used conjointly.

The phenols used for producing the novolak resins are most commonly phenol and cresol. But other phenols can also be used. Examples of these phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol, and mixtures of two or more of these phenols.

As hereinafter to be described, when it is desired to obtain a hollow novolak resin filament introduced with an ion-exchange group, this can be achieved by using as the starting material the foregoing phenols which have been substituted by an ion-exchanging group such, for example, as the sulfonic acid group, carboxyl group, ammonium group, the primary, secondary or tertiary amino group, and the quaternary ammonium group.

The aldehyde most commonly used for polycondensing with the above phenols is formaldehyde, but the monoaldehydes and dialdehydes such as paraformaldehyde, hexamethylenetetramine, furfural, glutaraldehyde, adipoaldehyde and glyoxal can also be utilized.

The acidic catalyst used for the reaction of forming the novolak resins may be any known organic or inorganic acid, for example, hydrochloric acid, nitric acid, sulfuric acid, phosphoric acid, formic acid, p-toluenesulfonic acid, acetic acid, oxalic acid or phthalic acid.

The alkali catalyst used is, for example, sodium hydroxide, potassium hydroxide, ammonia, calcium hydroxide and the like.

The fiber-forming thermoplastic synthetic resin, which may constitute the other element of the hollow novolak resin filament of the present invention is preferably selected from the group consisting of the polyamide resins, polyester resins, polyolefin resins and polyurethane resins. Other fiber-forming thermoplastic synthetic resins can also be utilized in this invention. The term "fiber-forming thermoplastic synthetic resin", as used herein and the appended claims, is meant to include not only the individual resins mentioned above, but also blends of the different resins, copolymerized resins of these with minor amounts of other copolymerized comonomers, or the blends of the same resins of different monomeric combinations or molecular weights.

Of these fiber-forming thermoplastic synthetic resins, the polyamide resins are especially to be preferred in view of their good dispersibility in the novolak resin, good effects of improving the spinnability of the novolak resin and little likelihood of adversely affecting the flame-resistant and anti-fusing properties of the novolak resin.

Specific examples of the fiber-forming thermoplastic synthetic that can be used in the invention include the polyamide resins such as nylon 6, nylon 11, nylon 12, nylon 66, nylon 610, nylon 611, nylon 612, and the blends of two or more of these with each other; the polyester resins such as polyethylene terephthalate, the polyesters derived from the same constituent elements as polyethylene terephthalate with a part of the ethylene glycol replaced by other known glycols, the polyesters derived from the same constituent elements as polyethylene terephthalate with the terephthalic acid replaced by ortho- or meta-phthalic acid, other known aliphatic dicarboxylic acids or blends of two or more of these with each other; the polyester ethers such as polyethylene oxybenzoate, and the polyolefin resins such as polyethylene, polypropylene, an ethylene-propylene copolymer, or blends of two or more of these with each other.

The filament obtained by spinning a blend of these synthetic resins with the novolak resin in which the synthetic resins are contained in an amount of 0. – 50 % by weight based on the total weight of the polymer have the advantage that its tensile strength, dyeability, elongation and abrasion resistance are much greater than in the case of the filament obtained from the novolak resin alone. While the use of a fiber-forming polymer in which the amount blended of the synthetic resin exceeds 50 % by weight is permissible, this is not desirable, since in the case of a filament prepared from such a polymer there is a possibility of difficulty being encountered in the elution and removal of the uncured resin during the hereinafter to be described extraction treatment that follows the curing treatment.

The above-described fiber-forming polymer, compound predominantly of an uncured novolak resin is formed into a filamentary form by a customarily used suitable method such as melt-spinning.

The melt-spinning apparatus and operation are well known, so a description thereof will not be made in this specification. The molten mixture to be melt-spun may contain hexamethylenetetramine in such an amount as to render it capable of inducing a partial cure of the mixture but not adversely affect the melt-spinning of the molten mixture containing the uncured novolak resin, for example, in an amount of less than 5 % by weight based on the uncured novolak resin. The incorporation of hexamethylenetetramine, however, is not altogether necessary, and it is sufficient that the melt-spun filament is cured using the curing reagent described above.

The known treatments such as filtration of defoaming of the molten mixture can be performed at any time before the molten mixture reaches the spinneret. The spun filament can be cured after its windup or at any time before the windup. The windup rate is usually about 200 to 2500 meters per minute. Usually, windup rates somewhat faster than the spinning speed have a faborable effect on the tenacity of the resulting filament.

Known oils, n-paraffinic hydrocarbons, etc., can be utilized as spinning oil preparations.

The cure of the spun filament can be performed in various ways. Of greatest importance in carrying out the cure in the present invention is that the cure is not carried to the whole of the cross-section of the filament but is stopped at a point up to a depth of 20 – 90 %, and preferably 40 – 70 %, of the cross-section of the filament extending from the peripheral portion of the filament towards the axial portion thereof. Thus, the cure of the present invention is so carried out that there is formed in the section of the filament a duplex structure consisting of a cured skin layer and an uncured core portion.

The curing operation is carried out by treating the uncured filament with a curing reagent in the presence of a curing catalyst.

Formaldehyde is most commonly used in the present invention as the curing reagent. Other curing reagents can also be used, examples being the aldehydes such as paraformaldehyde, hexamethylenetetramine, furfural, chloral or glyoxal, and the compounds which form formaldehyde on heating such, for example, as trioxane, tetraoxane or polyoxymethylene.

A basic or acidic catalyst is used for curing the filament obtained in accordance with the invention process. Examples of usable basic catalysts include ammonia, ammonium hydroxide, sodium hydroxide, potassium hydroxide and hexamethylenetetramine. Hexamethylenetetramine can not only be used as a curing reagent not needing a catalyst but also as a catalyst. Examples of acidic catalysts include such mineral acids as hydrochloric acid, sulfuric acid, nitric acid, phosphoric acid, boric acid, etc., organic acids such as acetic acid, oxalic acid, formic acid, butyric acid, benzenesulfonic acid, p-toluenesulfonic acid, etc., and the mixtures thereof.

According to the present invention, these curing reagents and curing catalysts can be either dissolved or dispersed in water or an orgainc solvent, for example, alcohols and ketones and be used in the form of a curing treatment liquid. In this case, water being inexpensive, it is most practical. The concentration of the curing reagent and the basic or acidic catalyst in the curing treatment liquid can be varied over a broad range depending upon the type and amount of the novolak resin, the type and amount of the thermoplastic synthetic resin, the denier of the filament, the way in which the curing is performed, and the like, and hence cannot be prescribed unqualifiedly. However, in general, the curing treatment liquid can contain the curing reagent in an amount roughly of 2 – 25 % by weight, preferably 5 – 20 % by weight, and especially 8 – 18 % by weight, and the acidic catalyst in an amount of about 5 – 25 % by weight, preferably 12 – 20 % by weight, and especially 14 – 18 % by weight, or the basic catalyst in an amount of about 1 – 10 % by weight, preferably 2 – 8 % by weight, and especially 3 – 5 % by weight.

A typical curing treatment liquid that can be used in the present process is that composed of 5 – 20 % by weight of formaldehyde, 14 – 20 % by weight of hydrochloric acid and 60 – 81 % by weight of water. Another is that composed of 15 – 38 % by weight of formaldehyde, 1 – 5 % by weight of ammonia and 84 – 57 % by weight of water.

The temperature at which the cure is carried out is not critical and can vary within broad limits depending upon the type and amount of the novolak resin, the type and amount of the thermoplastic synthetic resin, the denier of the filament, the way in which the curing is performed, the type and amount of the curing reagent, and the like. Usually usable is a temperature ranging between room temperature and 250°C., and preferably of the order of 10° – 100°C.

In a most generally preferred embodiment of the invention, the contact between the uncured filament and the curing reagent in the presence of a curing catalyst is accomplished either by immersing the melt-spun filament in a bath containing an aldehyde as a curing reagent in the presence of a curing catalyst or by running the filament through such a bath. The contact can also be carried out by other means such as spraying or fuming the uncured filament with a liquid containing the curing reagent and curing catalyst.

Several modes of carrying out the cure using an aldehyde as the curing reagent in the presence of an acidic catalyst will be given. For instance, in one mode, the uncured filaments are immersed in an aqueous solution of a mixture of an acidic catalyst and an aldehyde for 5 to 20 hours at a temperature ranging from about 25° to 105°C. In another mode, the filaments are immersed in an aqueous solution of said mixture, and then the solution is gradually heated up to 50° to 105°C. for about 0.5 to 5 hours. The cure may also be effected by contacting the uncured filaments with a gaseous mixture of an acidic catalyst and an aldehyde at a temperature from 30° to 105°C. It goes without saying that these procedures may be combined. The rate at which the temperature is raised is preferably not higher than 200°C. per hour.

Several modes of carrying out the cure using an aldehyde as the curing reagent in the presence of a basic catalyst will be given. For instance, in one mode, the uncured filaments are immersed in, or caused to run through, a bath containing the aldehyde and the basic catalyst at a temperature of about 15° to 40°C. Then the temperature is gradually raised until a temperature of 40° to 105°C. is reached. The rate at which the temperature is raised should preferably not exceed 50°C. per hour. Alternatively, the uncured filaments are treated with the solution at 40° to 105°C. for 15 to 120 minutes. Needless to say, the temperature may be raised within the foregoing temperature range during the treatment. When the above-described procedures are effected under pressure, a temperature higher than 105°C. may be used. This cure may also be effected by contacting the uncured filaments with a gaseous mixture of a basic catalyst and an aldehyde at a temperature from 30° to 105°C. for 20 to 120 minutes. In this case, ammonia is usually used as the basic catalyst and formaldehyde, as the aldehyde. It is most advantageous that the cure with the basic catalyst is effected at 60° to 80° C. for 30 to 60 minutes in an aqueous solution of formaldehyde and ammonia.

The concentrations of the aldehyde and the basic catalyst are varied depending upon the treating temperature, treating time and the like. Usually, the concentration of the aldehyde is 1 to 60 % by weight, preferably 12 to 45 % by weight, and most preferably 20 to 35 % by weight, and the concentration of the basic catalyst is usually 0.2 to 20 % by weight, preferably 1 to 10 % by weight, and most preferably 2 to 5 % by weight.

It is also possible to cure the uncured filament by a procedure of precuring the uncured filament with an aldehyde as a curing reagent in the presence of an acid catalyst and thereafter cure the precured filament with an aldehyde in the presence of a basic catalyst. In this case the two steps may be carried out by suitably selecting and combining the same conditions as hereinbefore indicated for the respective cases. This two-step curing has the advantage that the curing treatment to the depth prescribed by the present invention can be readily accomplished in a relatively short period of time, since there is no impairment of the filament form nor is there an indiscriminate progress of the curing reaction to the core portion of the filament. Hence, this two-step procedure is suitable for practicing the process of the invention.

The heat-curing time is optionally chosen according to the way in which the curing operation is performed, the heating temperature, the type and concentrations of the curing agent and catalyst, the type and amount of the novolak resin, the type and amount of the thermoplastic resin, the denier of the filament, etc. It is usually about 1 to 20 hours, especially 1 to 6 hours. If desired, this time can be either shorter or longer.

In short, ad hereinbefore indicated, the curing treatment according to the invention is carried out at a temperature and/or time such that, of the cross-sectional area of the filament, 20 – 90 % becomes the cured skin layer while 80 – 10 % becomes the uncured core portion.

As to whether the cured skin layer has been formed to the degree intended can be determined empirically. For instance, the degree of curing can be found in the following manner. A part of a filament in the process of being cured is taken out, the cross-section of the filament is dyed with a dye mixture prossessing different dyeability, and the ratio of the areas of the differently colored cured skin layer and uncured core portion is calculated from, say, a microphotograph of the filament cross-section. Alternatively, a part of a filament being cured is taken out and subjected to a hereinafter to be described solvent extraction treatment, e.g., extraction for 3 hours with methanol at its boiling point, using a Soxhlet apparatus, to prepare a hollow filament, after which the ratio of the areas of the skin layer and the hollow portion of the filament is determined by, say, a microphotograph of the cross-section of the filament.

Thus, the time required for achieving the desired degree of cure can be found. Hence, a filament having the desired degree of cured skin layer can be readily obtained by operating the curing treatment for the time period determined in the foregoing manner.

The melt-spun filament can be drawn at any desired time before and/or after curing. The drawing often results in imparting desirable properties to the filament.

The drawing operation may be conducted in one or more stages, and the filament can be either cold or hot drawn. In the case the drawing is carried out in multistages, cold and hot drawing can be optionally combined. The draw ratio is also optional, usable being a draw ratio of usually up to 2.5 based on the length of the undrawn filament.

The filament cured as hereinabove described, after having been subjected to water-washing and/or drying, as required, is then extracted with a solvent to remove the uncured polymer portion of the core portion of the filament by elution, whereupon is obtained a hollow novolak resin filament having the hereinbefore-described properties. At this time, in proportion as the amount of the solvent is increased or the temperature at which the extraction is conducted is raised, the formation of a filament having a more clearly defined hollow portion can be achieved more promptly.

The solvents which can be used in the solvent extraction treatment of the invention include the solvents for the fiber-forming polymer composed predominantly of the uncured novolak resin. That is, when the polymer is composed solely of the novolak resin, usable are those solvents which dissolve the novolak resin and, on the other hand, when the polymer of made up of both a novolak resin and a thermoplastic synthetic resin, usable are those solvents which dissolve both of these components.

Typical examples of these solvents incude alcohols, ketones, ethers, phenols and the aqueous inorganic alkali solutions, etc., but are not limited thereto and any solvent can be used so long as it is one which dissolves the aforesaid uncured fiber-forming polymer.

As usable alcohols, mention can be made of the saturated or unsaturated, straight-chain or branch-chained, mono- or polyhydric aliphatic alcohols, included being especially the lower alcohols of 1 – 6 carbon atoms, preferably those of 1 – 3 carbon atoms such as methanol, ethanol, n- or isopropyl alcohol and the like. As ketones, especially usable are the lower alkyl ketones such as acetone, methyl ethyl ketone and the like. As ethers, preferred are the cyclic ethers such as dioxane. As phenols, mention can be made of the aqueous solution of phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol and the like. The usable aqueous inorganic alkali solutions include the aqueous solutions of sodium hydroxide, potassium hydroxide and the like. These solvents can be used either singly or in combinations of two or more thereof. The solvent most suitable can be readily determined by a simple routine experiment. Usually, methanol, ethanol, acetone, methyl ethyl ketone and dioxane are most practical. The solvent extraction treatment can be carried out in customary manner such as by immersion of the filament in a bath containing the foregoing solvents.

In order to accelerate the elution of the uncured polymer curing the extraction treatment, it is preferred that the filament are agitated to an extent as will not cause damage to the filaments. Further, the extraction treatment is preferably repeated at least twice.

The temperature at which the extraction treatment is conducted is not critical and can be varied over wide limits depending upon the type of novolak resin used, the type and amount of the thermoplastic synthetic resin in the case this has been blended, the extent of the cure desired, etc. Usually, a temperature ranging between 0°C. and the boiling point of the solvent used, preferably 20° – 80°C., and especially 20° – 50°C., is practical as well as convenient.

The amount of solvent is also not critical and can be varied over wide limits depending upon the type of novolak resin used, the type and amount of the thermoplastic synthetic resin when this has been blended, the type of solvent, the extent of cure desired, etc. The optimum amount to be used can be readily determined by a routine experiment. Usually, the use of the solvent in an amount of at least 10 milliliters, and preferably 20 – 1000 milliliters, per gram (dry basis) of the filaments to be treated is desirable. As a practical mater, an amount in the range of 50 – 100 milliliters is preferred.

The uncured core portion of the filament can be completely eluted within a period of time of the order of usually 10 minutes to 2 hours.

The aforesaid solvent extraction treatment can not only be carried with the aforesaid cured filament in its continuous filament state but also with said filament in a state of such as a staple fiber, woven or knit fabric, felt, mat, nonwoven web and the like.

Further, the cured undrawn continuous filament or staple fiber can, as required, be drawn in the axial direction of the filament in a heated atmosphere of room temperature or 20° – 50°C. in the presence of a suitable swelling agent such as methanol or ethanol, and the like and thereafter submitted to the extraction treatment, or it can be drawn during the extraction treatment thereby yielding a hollow filament whose tensile strength has been enhanced.

Thus is obtained a hollow novolak resin filament consisting of a filamentary polymer predominantly of a flame-resistant and anti-fusing cured novolak resin composition and containing, if necessary, a thermoplastic synthetic resin and having a continuous, structure along the axial direction of the filament, the degree of hollowness of which is 10 – 80 %, and preferably 30 – 60 %.

The resulting continuous hollow novolak resin filament of this invention can be directly used in the form of monofilaments, multifilaments or tows, as well as in the form of fibers cut to desired lengths. Or it can be used as spun yarn either alone or in admixture with known filaments or fibers, or in the form of twisted yarns or the like. It can also be made into various filamentary structures such as knit or woven fabrices and nonwoven fabrics either along or in admixture with known filaments. Accordingly, the present invention includes within its scope a filamentary structure in a form selected from the group consisting of fibers, yarns, knit fabrics, woven fabrics, nonwoven fabrics, felt, mat or carpets and the like, which either contains or consists of a filamentary material derived from the hereinbefore-described hollow novolak resin filament of this invention.

The hollow novolak resin filament of the invention possesses flame-resistant and anti-fusing properties as in the case with the conventional nonhollow novolak resin filament. In addition, as shown in the hereinafter given examples, it possesses a flexural strength and insulation property superior to the conventional nonhollow novolak resin filament. Again, it is light and has a pliant handle.

Further, the invention hollow novolak resin filament demonstrates improved properties with respect to its dyeability, tenacity, elongation and abrasion resistance. Hence, it finds wide use for various industrial purposes.

As one of the interesting areas of its use, the novel hollow carbon filament obtained by subjecting the invention hollow novolak resin filament to a carbonization treatment, for example, by heating the hollow novolak resin filament at a temperature of 600°–1000°C in a nonoxidizing atmosphere, can be mentioned. This novel hollow carbon filament has a surface area of at least 400 square meters per gram, usually ranging 500 to 1000 square meters per gram and a degree of hollowness of 10–80%, and possesses excellent adsorption activity.

The hollow carbon filament described above can not only be applied to the areas in which the conventional active carbon has been used, but alos has also advantage that it can be utilized in new technical areas in which active carbon has not been applied hitherto because of its powder or granular form.

Said hollow carbon filament is submitted to a further stream activation treatment, and thus a hollow carbon filament having a surface area of usually 1000–3000 square meters per gram is obtained.

Another important area of application of the aforesaid hollow novolak resin filament of the present invention resides in its use as a hollow ion-exchange filament by introduction into the foregoing novolak resin filament of an ion-exchange group, such as a sulfonic acid group, carboxyl group, ammonium group, primary amino group, secondary amino groups, tertiary amino group, quarternary ammonuim group, hydroxyl group and halogen.

Thus is provided a hollow ion-exchange filament whose exchange capacity per unit weight is great and exchange speed is fast, with the consequence that high speed treatment is made possible even with a compact apparatus.

The hollow ion-exchange fialment can not only be used in such various forms for various purposes such as the ion exchange in the various kinds of liquids being treated or the removal of colloidal material, but also as filter material in treating various liquids, especially at elevated temperatures, because of its excellent insulation and flame-resistant properties as well as supperior dimensional stability. Further, since it is biochemically stable, its application in the biochemical field can be expected. Again, in view of its stability to radioactivity, there are hopes for its use in the treatment of industrial waste water in the atomic power industry. In addition, it can be applied to the reverse osmotic process.

The following examples are given for more fully illustrating the invention.

EXAMPLE 1

A. 1,410 g of phenol, 1,180 g of formalin (37 % aqueous solution of formaldehyde), 20 g of oxalic acid and 300 g of methanol were mixed, and reacted at 100°C. for 3 hours with stirring. A large quantity of cold water was added to the mixture to stop the reaction. The reaction product was dissolved in methanol, and the solution was heated at reduded pressure to evaporate off the unreacted phenol, formaldehyde and methanol and some water. There was obtained a thermoplastic novolak resin having an average molecular weight of 820.

500 g of the resulting novolak resin was coarsely pulverized, thoroughly dried, and then placed in a 1-liter stainless steel vessel adapted to be heated externally. After the vessel had been repeatedly purged with nitrogen gas, the novolak resin was melted at 160°C. The molten novolak resin was extruded from a nozzle held at 160°C. and having 18 holes with a diameter of 2.5 mm at a rate of 3 g/min. through a gear pump at the bottom of the stainless steel dissolving vessel. The filaments were taken up at a spinning rate of 1,050 m/min. on bobbins by a winder provided at a position 1.5 m below the nozzle.

The novolak filaments were taken up on two bobbins for 15 minutes each. One of the bobbins was left as it was, but the filaments on the other bobbin were cut and removed from the bobbin in the form of tow.

B. The novolak filaments in the form of tow prepared in (A) about 100 g) were immersed for 30 minutes in 1 liter of a mixed aqueous solution containing 18 % by weight of formaldehyde and 18 % by weight of hydrochloric acid, and then in the course of 4 hours, gradually heated to 95°C. to cure the filaments. The filaments inside were withdrawn, and immediately washed repeatedly with cold water. The filaments were further washed with hot water held at about 90°C., then, fully dehydrated, and without drying, placed in 1 liter of methanol, followed by heating for 1 hour at 60°C. within a vessel provided with a refluxer to dissolve the uncured portion (core portion) of the novolak resin. The filaments were then washed with fresh methanol and water consecutively and dried to form hollow filaments. The sectional areas of the filaments were photographed microscopically, and the rae of hollowness was measured and found to be 62 %.

For comparison, the above curing treatment was continued, and when the treating temperature reached 95°C., the curing reaction was performed for an additional 4 hours. Then, the cured filaments were dehydrated, and washed with water repeatedly, and the remaining hydrochloric acid was neutralized with aqueous ammonia. The filaments were further washed fully and dried to form filaments which were entirely cured.

The properties of the filaments prepared above were measured, and the results are shown in Table 1 below.

Table 1

| Sample filaments | Tenacity (g/d) | Elongation (%) | Flexural strength (times)* | Apparent density | Degree of heat insulation (minutes)** |
|---|---|---|---|---|---|
| Hollow filament of this invention | 1.78 | 21.3 | 3,700 | 0.58 | 150 |
| Comparison filament | 1.80 | 25.6 | 1,100 | 1.25 | 40 |

*The flexural strength is expressed by the number of flexes of a single filament under a load of 0.5 g/d until the filament broke.
**The degree of heat insulation is the time required for the center of a ball with a diameter of 5 cm made of 5 g of the filament to attain a temperature of 100°C. when the ball is maintained in an atmosphere at 100°C.

When the filament of this invention was exposed to flame, it was only carbonized without showing any combustibility as in the case of the comparison filament.

C. Ten grams of the hollow novolak filaments prepared in (B) above were disposed in a transverse-type reaction furnace. After the air inside the furnace had been removed by nitrogen gas, the temperature was raised from room temperature (25°C.) to 700°C. at a rate of 600°C./hour. At this temperature, the fibers were reacted for 30 minutes. By flowing a small amount of nitrogen gas during this time, the oxidation of the fibers curing by the inflow of air was prevented. After been cooled to room temperature, the filaments were taken out. There were obtained 5.5 g of carbonized filaments having a surface area of 750 m²/g. The filaments had a degree of hollowness of 59 % which was almost the same as that of the starting phenol filaments.

Carbonized filaments were obtained by baking the comparison filaments prepared in (B) above. The yielded amount was 5.6 g, and the surface area was 480 m²/g.

Using the hollow carbonized filaments of this invention and the comparison carbonized filaments, a test was conducted to remove methylene blue from an aqueous solution by the following procedure.

To 50 cc of an aqueous solution of methylene blue assuming a dark blue color (concentration 100 mg/l) was added 0.1 g of the hollow carbonized filaments. the mixture was stirred, and allowed to stand for one day. The solution became almost colorless and transparent, and the rate of removal of methylene blue as measured from the percentage permeation was 98 %. On the other hand, when the comparison carbonized filaments were used, the rate of removal was only 75 %, and a blue color was still observed.

D. Hollow novolak filaments obtained by the same procedure as in (B) above were sulfonated to prepared hollow ion-exchanged filaments by the following procedure.

Ten grams of the hollow filaments were mixed with 500 g of 25 % fuming sulfuric acid to sulfonate them for a predetermined period of time. Then, the fuming sulfuric acid was removed, and the filaments were thoroughly washed with water and dried in vacuo at 70°C. to form cation-exchanged filaments of the sulfonic acid type.

The cation-exchanged filaments were then immersed for 20 hours in a 1/10 N NaOH aqueous solution to measure their ion exchange capacity. The properties of the resulting filaments and the ion exchange capacities are shown in Table 2.

Table 2

| Sulfonation | | | Quality of filaments | | |
|---|---|---|---|---|---|
| Reaction time (hours) | Ion exchange capacity (meq/g) | Tenacity (g/d) | Elongation (%) | Bending* strength (times) | Apparent density |
| 0 | 0 | 1.18 | 21.3 | 3700 | 0.58 |
| 1 | 1.8 | 1.11 | 18.1 | 3100 | 0.60 |
| 5 | 3.9 | 0.87 | 16.2 | 2700 | 0.64 |
| 10 | 4.2 | 0.82 | 15.0 | 2500 | 0.65 |

*Number of flexes until the filament breaks under a load of 0.5 g/d.

The section of the hollow ion-exchanged filament was photographed microscopically, and the rate of hollowness was measured and found to be 55 to 65 %.

In order to compare the ion-exchange rates of these filaments, the following test was performed.

The following two samples were used.

A: a sample obtained by converting the hollow ion-exchange filament of the sulfonic acid type shown in Table 2 which had an ion exchange capacity of 1.8 meq./g to the sulfonate salt type using sodium hydroxide.

B: granular ion-exchange resin (Amberlite IR-120B, sulfonate salt type; product of Rohm and Haas)

150 ml. of each of these samples was packed into a glass adsorbing tower equipped with a cock at its top and bottom and having a diameter of 30 mm and a height of 500 mm at a packing density of 0.30 g/ml. An aqueous solution of ferric chloride (200 ppm) was passed through the tower at a temperaure of 25°C. and a flow rate of 600 ml./min. to remove ferric ions. The ferric ion concentration of the treating water was determined, and the results are shown in Table 3.

Table 3

| Samples | Concentration of ferric chloride after treatment (ppm) Treating time (minutes) | | | |
|---|---|---|---|---|
| | 10 | 30 | 50 | 100 |
| A (invention) | 1.2 | 1.4 | 2.2 | 5.8 |
| B (comparison) | 7.2 | 7.5 | 8.3 | 12.0 |

From the results shown in Table 3, it can be concluded that the hollow ion-exchanged filaments of this invention have an extremely high rate of adsorbing ferric ions, and such a high speed treatment can be fully performed. When the hollow filaments which had adsorbed the ferric ions were regenerated in a customary manner, and tested again, there was no change in adsorbability, pressure drop, etc., and such fibers were found to have superior durability.

EXAMPLE 2

The novolak continuous filaments would on a bobbin which were prepared in EXAMPLE 1 (A) were immersed in 3 liters of a mixed aqueous solution containing 18 % by weight of formaldehyde and 18 % by weight of hydrochloric acid at 20°C., and immediately, the temperature of the solution was raised to 95°C. in the course of 2.5 hours. The bobbin was withdrawn, washed thoroughly with water, and then immersed in 3 liters of a mixed aqueous solution containing 33.3 % of formaldehyde and 2.8 % of ammonia at 20°C. The solution was heated up to 60°C. in the course of 1 hour to cure the filaments. The bobbin was again withdrawn, squeezed free of water, thoroughly washed with flowing water and hot water to remove the formaldehyde and ammonia fully, and then dried. Then, the phenol filament on the bobbin were released in the form a skein.

One end of the phenol filament in the form of a skein was tied and immersed in 1 liter of acetone, and the uncured portion of the filament was dissolved by placing the filament for 40 minutes in boiling acetone, in a vessel equipped with a refluxer.

By microscopic examination of the cross section, the filament was determined to have a degree of hollowness of 46 %. The resulting hollow filament had a soft and pliable feel that has not been observed in the conventional phenol filaments, and was heat infusible and incombustible.

EXAMPLE 3

450 g of the termoplastic novolak resin having a same average molecular weight and prepared in the same way as Example 1 (A) were mixed and melted together with 50 g of nylon 6 having a relative viscosity, as measured on 98 % sulfuric acid at 30°C., of 3.10 in an atmosphere of nitrogen at 200°C. to form a novolak nylon-6 mixed resin.

The mixed resin obtained was pulverized coarsely and fully dried. It was then spun in the same way as in Example 1 (A), and wound up on bobbins as continuous filaments.

The continuous filaments on the bobbins were cured in the same way as in Example 2. The filaments so cured were wound back on a paper cone, and then knitted by a circular knitting machine. 20 g of the resulting knitted fabric was put into a vessel equipped with a reflux condenser, and 500 cc of dioxane was poured into it. It was then maintained in the boiled state for 15 miinutes. Immediately then, 500 cc of fresh dioxane was exchanged, and for an additional 15 minutes, the uncured portion (core portion) of the filaments was dissolved. The fabric was thoroughly washed with water repeatedly and dried. The monofilaments that constituted the fabric were pulled out, and examined microscopically. As a result, it was found that the filaments had a degree of hollowness of 31 %.

As a comparative experiment, the knitted fabric before treatment with dioxane was cured in the same formaldehyde/ammonia mixed aqueous solution as used above for 2 hours at 80°C. to cure the constituent filaments entirely. Then, the fabric was thoroughly washed with water, and dried.

Each of the two knitted fabrics so treated was folded quadruply, and a weight of 50 g was placed on it, and this state was maintained for 15 minutes. Then, the weight was removed. While the control fabric remained folded on removal of the weight, the fabric consisting of the hollow filaments of this invention demonstrated elasticity, to such an extent that the folded portion could not be ascertained.

EXAMPLE 4

The filament of the novolak/nylon-6 mixture whose outer peripheral portion was cured (prepared in Example 3) was cut to a length of 30 cm. Both ends of the tow-like filament were fixed to a manually-operable drawing machine, and immersed in methanol held at 50°C. Then, it was gradually drawn to 1.7 times the original length, and in the fixed state, maintained in methanol for 1.5 hours at 50°C. The drawn filaments were removed, and used for various tests. The results are shown in Table 4.

For comparison, the results obtained with hollow filaments which are prepared under the same conditions as above except that the filaments were not drawn are also shown in Table 4.

Table 4

|  | Rate of hollow-ness(%) | Tena-city (g/d) | Elon-gation (%) | Bending strength | Degree of heat insu-lation(min.) |
|---|---|---|---|---|---|
| Filament of this invention | 35 | 2.81 | 15.4 | 1500 | 120 |
| Comparative filament | 38 | 2.05 | 30.2 | 410 | 130 |

EXAMPLE 5

Novolak filaments prepared in the same way was in Example 1 (A) were treated under the same conditions as in Example 1 (B) except that only the curing conditions were varied. Thus, hollow novolak filaments having various rates of hollowness were produced, and their physical properties were measured. The results are shown in Table 5 below.

Table 5

| Rate of hollowness (%) | Tensile strength (g/d) | Bending strength (times) | Apparent density | Degree of heat insula-tion (min.) |
|---|---|---|---|---|
| 0 | 1.80 | 1100 | 1.25 | 40 |
| 5 | 1.81 | 860 | 1.23 | 38 |
| 10 | 1.75 | 1900 | 1.20 | 62 |
| 30 | 1.82 | 2500 | 0.87 | 130 |
| 60 | 1.78 | 3700 | 0.58 | 150 |
| 80 | 1.02 | 420 | 0.30 | 185 |
| 83 | 0.6 | less than 50 | 0.24 | 203 |

It can be concluded from the above results that the filaments having a rate of hollowness lower than 10 % have low bending strength and degree of heat insulation, and those having a rate of hollowness greater than 80 % have much reduced tensile strength and bending strength, causing various troubles in end uses.

What is claimed is:

1. A hollow filament comprising a filamentary polymer composed of from 50% to 100% by weight of a flame-resistant and anti-fusing cured novolak resin and up to 50% by weight of a fiber-forming thermoplastic synthetic resin selected from at least one of the group consisting of polyamides, polyesters, polyesterethers, polyolefins and polyurethanes, characterized in that the hollow structure continuously extends in the axial direction of the filament, the degree of hollowness thereof being in the range of 10-80%.

2. The hollow filament of claim 1 characterized in that said degree of hollowness is in the range of 30–60%.

3. The filament of claim 1, in which the thermoplastic synthetic resin is present in an amount of at least 0.1% by weight.

4. The hollow filament of claim 3, characterized in that said fiber-forming thermoplastic synthetic resin is a polyamide resin.

5. The hollow filament of claim 3, characterized in that said resin is selected from the group consisting of nylon 6, nylon 11, nylon 12, nylon 66, nylon 610, nylon 611, nylon 612, polyethylene terephthalate, polyethylene oxybenzoate, polyethylene and polypropylene, and their mixtures.

6. The filament of claim 3, in which the thermoplastic resin is present in an amount of from 5 to 30% by weight.

7. The filament of claim 6, in which the thermoplastic resin is present in an amount of from 10 to 25% by weight.

8. The filament of claim 2, in which the degree of hollowness is in the range of 40 to 55%.

9. The filament of claim 1, in which the novolak resin has an average molecular weight of up to about 5,000.

10. The filament of claim 9, in which the novolak resin has an average molecular weight of from about 300 to about 2,000.

11. The filament of claim 1, in which the novolak resin is the reaction product of an aldehyde and at least one of the group consisting of phenol and cresol.

12. The filament of claim 1, in which the novolak resin is the reaction product of formaldehyde and a phenol.

13. The filament of claim 1, in which the novolak resin is the reaction product of formaldehyde and at least one of the group consisting of phenol and cresol, the thermoplastic synthetic resin is nylon and is present in an amount of from 10 to 25% by weight, and the filament has a degree of hollowness of from 40 to 55%.

* * * * *